United States Patent Office 3,348,341
Patented Oct. 24, 1967

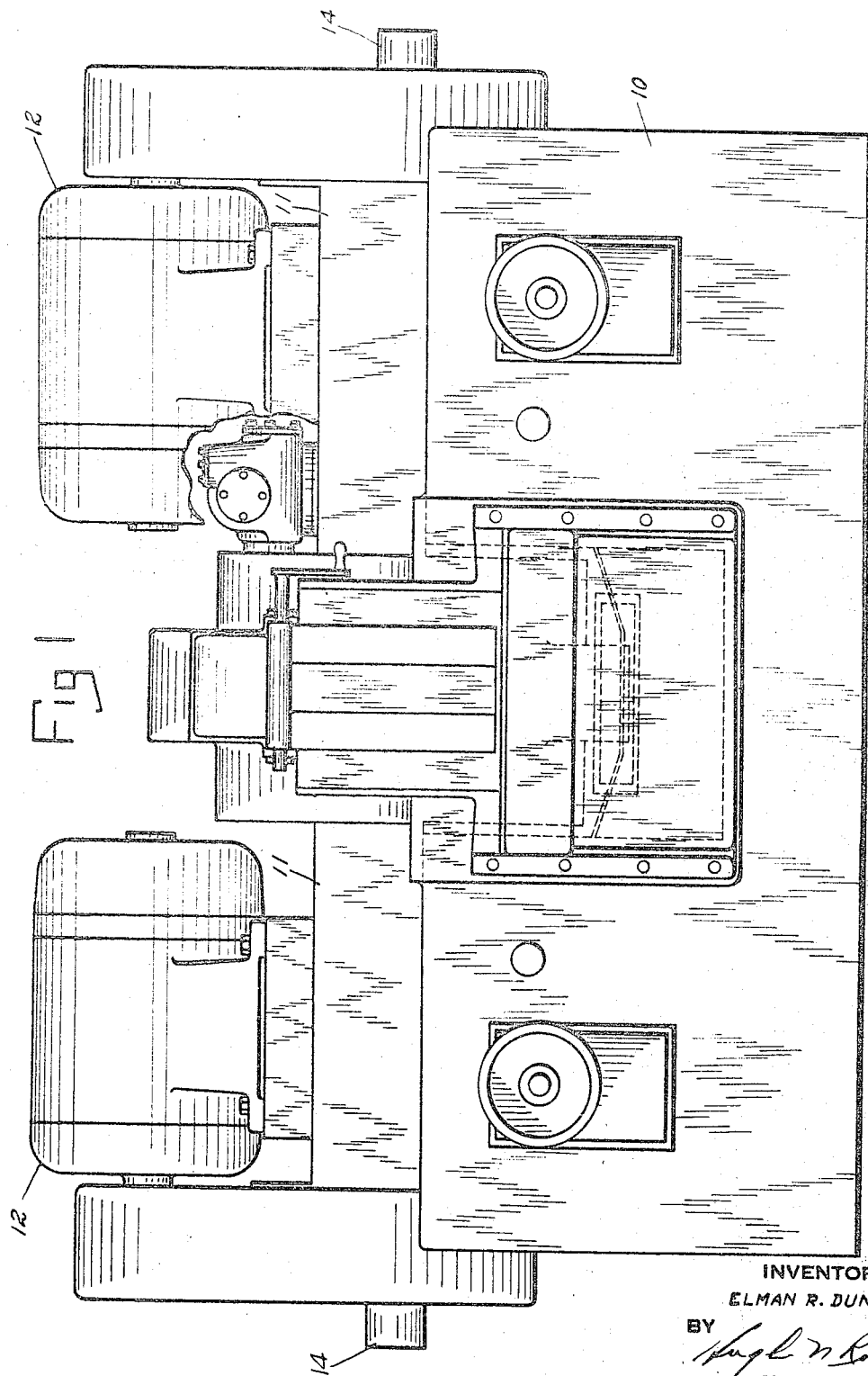

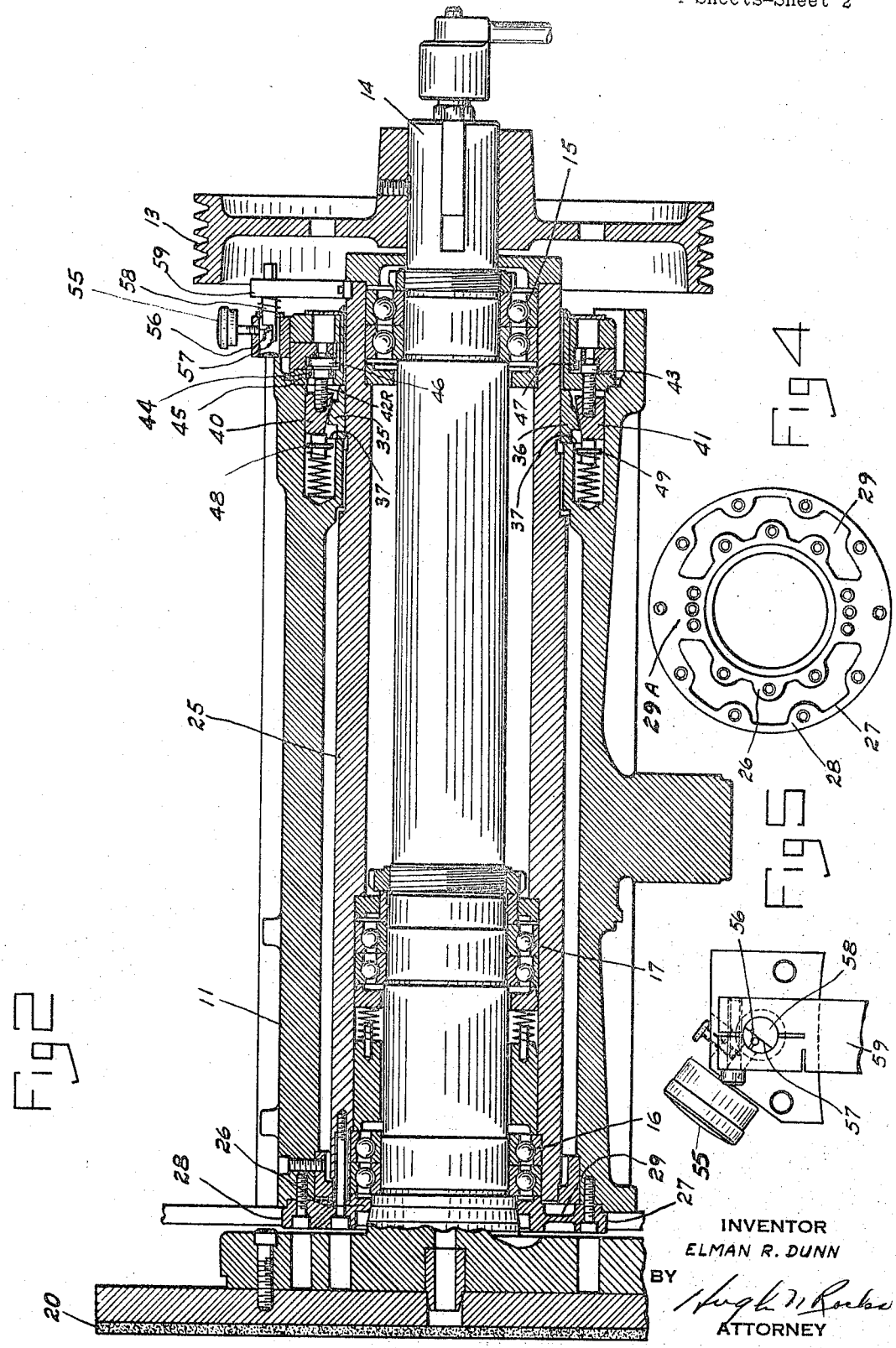

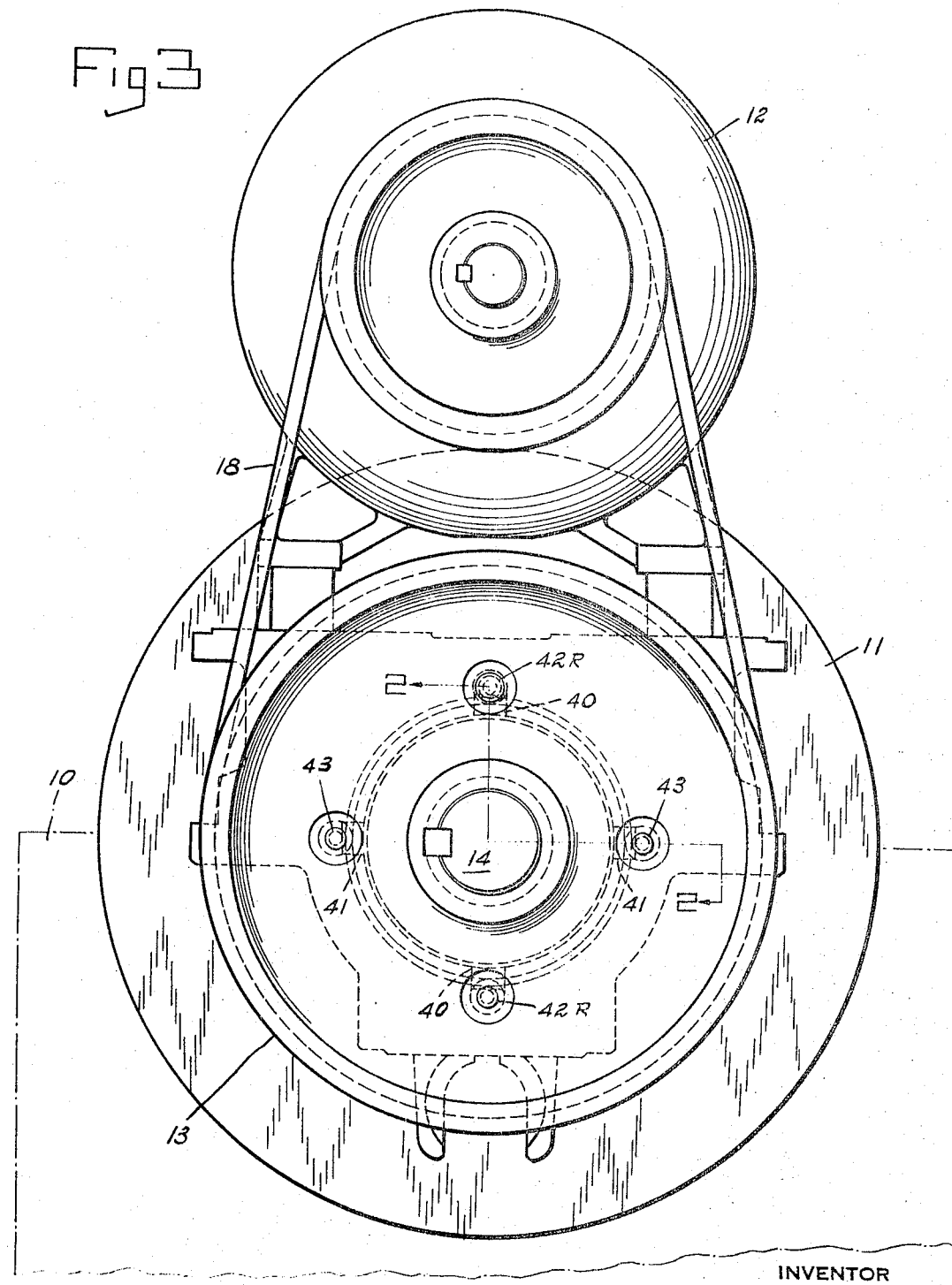

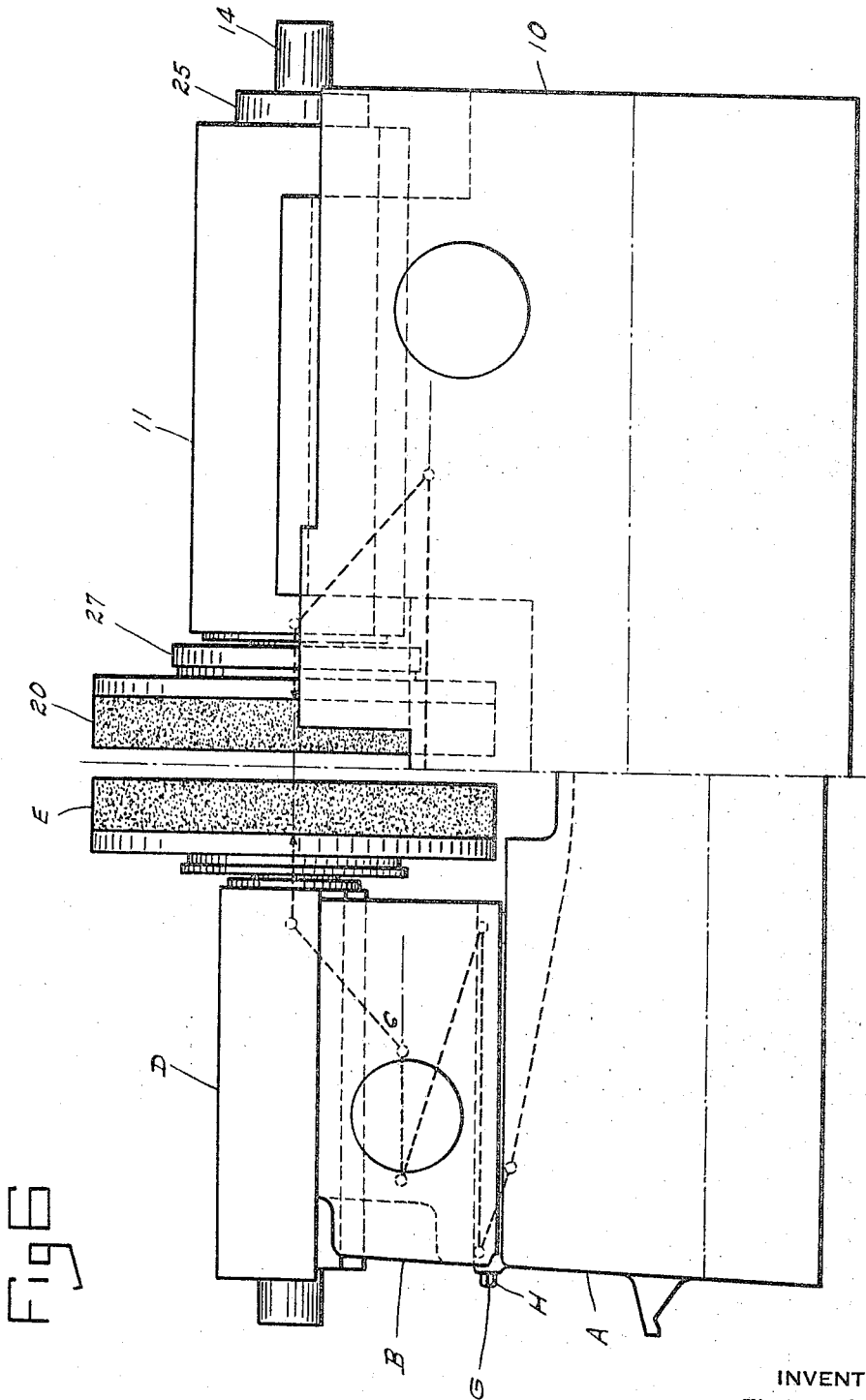

3,348,341
ABRASIVE DISC SPINDLE MOUNTING
Elman R. Dunn, Roscoe, Ill., assignor to Landis Tool Company, Waynesboro, Pa.
Filed July 16, 1964, Ser. No. 383,152
9 Claims. (Cl. 51—111)

This invention relates to machine tools, particularly machine tools having one or more rotatable cutting members which must have provision for rotation in different planes.

One example of such a machine tool is a disc grinder. A disc grinder is a grinding machine in which the annular face of an abrading member performs the grinding operation on a workpiece.

In a double disc grinder, the annular faces of the opposed discs may be aligned parallel for some operations and aligned out-of-parallel for other operations. When out-of-parallel, the point at which the opposing faces approach most closely, may be in different angular positions depending on the path of travel of the work. The operation involved in setting the discs in the desired relation is known as "head setting."

The usual practice in machines of this type for "head setting" is to mount the spindle housing slidably on an intermediate support member between the spindle housing and the base of the machine. The intermediate support member is mounted for swivelling on the base about a vertical pivot. There is also means for tilting the intermediate support member and the spindle housing about a horizontal axis. For this type of adjustment, the axes about which the adjustments are made are remote or offset from the center of the spindle. As a result, the center of the disc moves in a relatively long arc, of a radius which is equal to the distance between the pivot axis and the center of the disc, with proportionately great displacement of the center of the disc.

It is, therefore, an object of the present invention to provide means whereby both centers or pivot points about which the disc is adjusted, will be as close as possible to the center of the disc to minimize the amount of displacement of the center of the disc when making a change in the desired head setting.

Another object is to eliminate the intermediate support member and mount the spindle and spindle housing so as to retain the swivel and tilt functions of said member within a slide member which is mounted directly on slideway surfaces of the base of the machine. This permits the base to be built higher and, therefore, more rigid in opposing the grinding and feeding forces. It also eliminates a metal to metal joint between the slide and the base in the former construction.

Another object is to swivel the spindle and its bearings as a unit separate from the slide member in which they are mounted.

Another object is to mount the spindle and bearings in a member mounted for swiveling in the slide.

One of the most effective means for maintaining size in a double disc grinding machine is a reduction of what is referred to as "linear stretch out of metal." This expression may be defined as the distance the grinding force exerted on the disc must travel before it is absorbed by the machine base. The shorter the distance, the greater the rigidity of the disc mounting and the greater the ability of the machine to hold size. This distance is determined by the number of elements involved in transmitting the force. It includes every metal to metal contact through which the force must pass. In previous machines, the force on the disc was first transmitted to the spindle housing which was slidably mounted on a slide member. The first metal to metal contact is that between the spindle and spindle housing. From this point, the force passes through the guide surfaces to the nut and then to the feed screw in the slide. In the feed screw, the force passes through the point of contact between the slide and the base of the machine, specifically, the point at which the slide is pivotally supported on the base for tilting in a vertical plane. The force then proceeds to the outer end of the slide to a sub-slide member and from the sub-slide member to the base, and then to the inner portion of the base.

The rigidity of the disc mounting is thus determined not only by the distance the grinding force travels before it is absorbed in the base, but also the number of metal to metal joints through which it must pass. The total number of joints and the distance traveled by the force seriously affect the rigidity of the disc mounting— the larger the figures, the less rigid the mounting.

In applicant's device, there is no conventional mechanical joint between the spindle mounting and the slide since since the two are positively connected. The first joint is between the slide and the base. The second joint is a nut in the slide and the feed screw in the base. The force is then transmitted through the feed screw directly to the base, close to its central portion. The rigidity or resistance to separation of opposed grinding discs in applicant's device is roughly 8 to 10 times that of previous machines. This has been accomplished largely by the new relation between the spindle, spindle housing, slide and the higher and more rigid base.

In applicant's device, that portion of the force path passing through the slide has been completely eliminated. The remaining path has been reduced substantially due to the higher base member and the fact that are the force path travels only one-fourth the length of the base, whereas, in previous machines, the travel was nearly the entire length of the base. The force path is confined to the center of the machine.

Another object is to reduce the number of parts and contacting surfaces in a machine.

Another object is to reduce the distance through which the feeding and grinding forces must be transmitted from the disc to the base.

FIG. 1 is a front elevation of a horizontal spindle double disc grinder in which the sliding members which carry the spindle are mounted to slide directly on the base.

FIG. 2 is a sectional elevation of a spindle assembly on line 2—2 of FIG. 3.

FIG. 3 is an end elevation of a spindle.

FIG. 4 is an end elevation of a deformable member for supporting one end of the spindle housing.

FIG. 5 is a partial end elevation of the mounting and actuating means for the indicator.

FIG. 6 is a diagram of the force path in a conventional machine and in the machine of this invention.

For the purpose of illustration, the invention is shown as applied to a disc grinder of the type known as a feed thru machine. In this type of machine, the work is fed between the discs in a horizontal path. The space between the discs at the point where the work enters is usually greater than at the opposite side where the work emerges. For this type of operation, the axes of the discs are adjusted only in a horizontal plane according to stock removal requirements of various workpieces. Where the work is caused to follow a different path between the discs, the axes of the discs may be adjusted in a vertical plane or in both vertical and horizontal planes to provide a compound adjustment.

The slide member in the machine is mounted on the base in a manner similar to that in which the spindle housing is mounted on an intermediate slide as in U.S. Patent 2,962,841, granted Dec. 6, 1960, that is, with the plane of the guide surfaces passing through the spindle so that a substantial portion of the spindle is below the plane of said guide surfaces. This arrangement is even more advantageous than that of the above mentioned patent. In the patent, the rotating force on the spindle and disc is transmited to the base through the slide. In this case, the rotating force is applied directly to the base, thus eliminating the less stable support of an intermediate slide and providing a much more rigid support for the spindle and disc.

The base of the machine is indicated by numeral 10. The two slides slidably mounted directly on base 10 are both indicated by numeral 11. Driving motors 12 mounted on slides 11 are connected through suitable belts 18 and pulleys 13 to spindle 14. The pulley end of spindle 14 is mounted in bearing 15. The wheel end of spindle 14 is mounted in thrust bearing 16.

Intermediate bearings 17 are located on spindle 14 in closer relation to bearing 16 than to bearing 15, so that maximum stiffness of spindle 14 will result in providing secure support for abrading disc 20. Bearing 17 is spring pre-loaded in a manner to constantly preload bearing 16 in the same direction as the grinding thrust pressure.

Spindle 14 and bearings 15, 16 and 17 are rotatably supported in spindle housing 25. The disc end of housing 25 is attached to the inner portion 26 of spindle cap 27. The outer portion 28 of cap 27 is attached to slide 11. Spindle cap 27 has a thin-sectioned deformable intermediate portion 29 which serves as a pivot about which disc 20 may be adjusted to different planes of rotation. For some applications, cap 27 will have oppositely disposed thin-sectioned portions 29 separated by oppositely disposed thick sections 29a.

In considering FIG. 2, it should be remembered that the upper half of this figure is along the vertical portion of line 2—2 in FIG. 3. The lower portion of FIG. 2 is along the horizontal portion of line 2—2 in FIG. 3.

The pulley end of spindle housing 25 is positioned radially by two wedge member 40 positioned 180° apart in a horizontal plane and slidably mounted in slide 11, and two wedge members 41 180° apart in a vertical plane and also slidably mounted in slide 11. For each wedge member 40 in a horizontal plane, there is a wedge block 35 having an axially curved surface in engagement with wedge member 40. Wedge block 35 is slidably mounted to move in a vertical direction on housing 25 at right angles to the axis of spindle 14. For each wedge member 41, there is a wedge block 36 having an axially curved surface in engagement with wedge member 41. Wedge block 36 is slidably mounted to move in a horizontal direction on spindle housing 25 at right angles to the axis of spindle 14. Each wedge block 35 and 36 is held endwise between a machined surface 37 of slide 11 and bearing housing 45.

One of the wedge members 40 is adjustable endwise in slide 11 by means of a socket head screw 42R having right hand threads. A similar screw 42L has a left hand thread engaging the oppositely positioned wedge member (not shown). Each screw 42R and 42L is rotatably supported in an anti-friction bearing 44 in bearing housing 45. The head of each of the screws 42R and 42L is a pinion 46 which engages adjusting bear 47 on housing 25.

Rotation of gear 47 by suitable means (not shown) turns both screws 42R and 42L to shift one of the wedge members 40 to the left and the other to the right to shift spindle 14 in a horizontal plane. During this movement of housing 25, the vertically positioned wedge blocks 36 remain in fixed relation to the co-acting wedge members 41, this being permitted through the sliding relation between the wedge blocks 36 and housing 25. The movement of spindle 14 acts through cap 27 to shift disc 20 from one plane of rotation to another plane at an angle to said first plane. This adjustment of wedge members 40 is effected in cooperation with spring-pressed shoes 48, one of said wedge members being shifted inwardly against its co-acting spring-pressed shoe, the other wedge member being shifted outwardly by its co-acting spring-pressed shoe. The amount of adjustment is shown by indicator 55.

Because of certain structural limitations, the diameter of the disc which determines the magnitude of the out-of-parallel adjustment of the disc, is different than the distance between said axis of adjustment and indicator 55. In order to compensate for this difference and to avoid the need for a specially calibrated indicator, indicator 55 (FIG. 5) is mounted with the axis of feeler 56 at right angles to an inclined surface 57 on a horizontal contact rod 58. Surface 57 is a portion of rod 58 which is connected to housing 25 by bracket 59. The angle of surface 57 is, in this case, 35°, 42 minutes, so that, with a conventional standard calibration of the indicator, the movement of the outer edge of the disc can be read directly on the indicator. In production usage of the machine, only the wedge members 40 which are affected by screws 42R and 42L, would be subject to frequent adjustment, according to the nature of stock removal requirements which vary from job to job. Where the machine is used with a rotary carrier, housing 25 and cap 27 will be mounted in an angular position in accordance with the point at which the carrier introduces workpiecss between the discs.

Wedge members 41 are adjusted by conventional socket head screws 43 which may be adjusted individually and independently of screws 42R and 42L. Adjustment of wedge members 41 is effected in cooperation with spring-pressed shoes 49. Wedge members 41 which are adjustable by screws 43 ordinarily are adjusted only during the initial building of, or subsequent re-aligning of the entire machine, and not from job to job.

FIG. 6 is a grinder thrust force coupling diagram. The left hand side of FIG. 6 is a conventional disc grinder construction having a base A and a slide B tiltable about a point C. Spindle housing D is slidably mounted on slide B. Disc E is mounted on spindle F which is rotatably mounted in housing D.

The right hand side of FIG. 6 represents the machine of the present invention in which base 10, having a height greater than the combined height of base A and slide B of the conventional machine, provides a direct support for slide 11. As previously described, spindle 14 is rotatably supported in housing 25 which, in turn, is mounted inside slide 11 and attached to slide 11 at the disc end by means of cap 27. Because of the increased height of the base and the elimination of slide B, the grinding force acting on disc 20 is applied directly to the base through the feed screw (not shown) as indicated by the dotted lines.

In contrast to this, in the conventional machine on the left hand side of FIG. 6, the grinding force is transmitted first from housing D to the feed screw in slide B, from said feed screw to point C at the right hand end of slide B, then to the sub slide key at the left hand end of said slide B and from the sub slide key through an adjusting screw G and nut H to base A. This path is also shown by a dotted line. The length of the dotted lines in each case is an indication of the rigidity of the elements supporting disc E. The shorter the line, the greater the rigidity.

I claim:
1. In a disc grinder,
  (a) a base,
  (b) a pair of members slidable longitudinally on said base,
  (c) a spindle mounting for each of said slidable members comprising
  (d) a spindle housing in each member,
  (e) spaced spindle bearings in said housing,
  (f) a spindle rotatably mounted in said bearings,
  (g) an abrasive disc at one end of said spindle,
  (h) driving means at the other end of said spindle,
  (i) means to change the plane of rotation of said abrasive disc including
  (j) a pivotal member connecting said housing with said slidable member for adjusting said housing about a point on the axis of said spindle adjacent the center of said abrasive disc,
(k) means for supporting the other end of said housing for radial adjustment,
(l) an indicator for showing the extent of said radial adjustment,
(m) and an indicator actuating means on said housing having an actuating surface such that said indicator shows an extent of movement other than the extent of said radial movement of said actuating means.

2. In a disc grinder,
(a) a base,
(b) a pair of members slidable on said base,
(c) a spindle mounting for each of said slidable members comprising
(d) a spindle housing in each member,
(e) spaced spindle bearings in said housing,
(f) a spindle rotatably mounted in said bearings,
(g) an abrasive disc at one end of said spindle,
(h) driving means at the other end of said spindle,
(i) means to change the plane of rotation of said abrasive disc including
(j) a deformable member for connecting said housing with said slidable member for adjusting said housing about a point on the axis of said spindle adjacent the center of said abrasive disc,
(k) means for supporting the other end of said housing for radial adjustment,
(l) an indicator for showing the extetnt of said radial adjustment,
(m) and an indicator actuating means on said housing having an inclined actuating surface such that said indicator shows a movement less than the radial movement of said actuating means.

3. In a disc grinder,
(a) a base,
(b) a member slidably mounted on said base,
(c) a spindle housing in said member,
(d) a spindle rotatably mounted in said housing,
(e) an abrasive disc on one end of said spindle,
(f) means to change the plane of rotation of said abrasive disc comprising
(g) defromable means for pivotally supporting one end of said spindle at a point on its axis adjacent the center of said disc,
(h) and means to shift the other end of said spindle housing radially in different directions relative to said slidable member.

4. Apparatus of claim 3 having an indicator operable in response to said radial adjustment and arranged to read in terms of movement of said abrasive disc.

5. Apparatus of claim 3 in which the indicator is provided for showing the extent of radial adjustment, and an indicator actuating means is also provided on said housing having an actuating surface such that said indicator shows an extent of movement other than the extent of said radial movement of said actuating means.

6. Apparatus of claim 3 having an indicator for showing the extent of said radial adjustment and an indicator actuating means on said housing having an inclined actuating surface such that said indicator shows a movement less than the radial movement of said indicator actuating means.

7. Apparatus of claim 3 in which said deformable means includes
(a) an outer mounting portion secured to said member,
(b) an inner mounting portion secured to said housing, and
(c) a pair of diametrically aligned radial portions extending between said outer mounting portion and said inner mounting portion and supporting said inner mounting portion for said pivotal movement relative to said outer mounting portion.

8. Apparatus of claim 3 in which said deformable means includes
(a) an outer mounting portion secured to said member,
(b) an inner mounting portion secured to said housing,
(c) a pair of diametrically aligned radial portions extending between said outer mounting portion and said inner mounting portion and supporting said inner mounting portion for said pivotal movement relative to said outer mounting portion, and
(d) a thin-section filler between said outer mounting portion, said inner mounting portion and said radial portions.

9. Apparatus of claim 3 in which said deformable means includes
(a) an outer mounting portion secured to said member,
(b) an inner mounting portion secured to said housing, and
(c) an intermediate portion extending between said outer mounting portion and said inner mounting portion and supporting said inner mounting portion for pivotal movement relative to said outer mounting portion, said intermediate portion being of a thin section as compared to said outer mounting portion and said inner mounting portion.

References Cited
UNITED STATES PATENTS

| | | | |
|---|---|---|---|
| 1,364,675 | 1/1921 | Almfelt | 51—166 |
| 1,967,163 | 7/1934 | Thearle | 51—169 |
| 2,424,448 | 7/1947 | Gardner | 51—111 |
| 2,926,466 | 3/1960 | Dunn | 51—111 |
| 2,952,949 | 9/1960 | Maker | 51—166 |
| 2,962,841 | 12/1960 | Price | 51—109 |

HAROLD D. WHITEHEAD, *Primary Examiner.*

PO-1050
(5/69)

UNITED STATES PATENT OFFICE
CERTIFICATE OF CORRECTION

Patent No. 3,348,341                          Dated  October 24, 1967

Inventor(s)    ELMAN R. DUNN

It is certified that error appears in the above-identified patent
and that said Letters Patent are hereby corrected as shown below:

Col. 3, line 39, read "member" as --members--; line 61,
read "bear" as --gear--.
Col. 4, line 23, read "workpiecss" as --workpieces--; line
25, read "43" as --43R and 43L--; line 29, read "43" as --43R
and 43L--.
Col. 5, claim 2, part (1), read "extetnt" as --extent--;
claim 3, part (g), read "defromable" as --deformable--.
In the drawings, sheet 2, Figure 2, reference numeral "43"
reads --43L--.
Sheet 3, Figure 3, remove reference number "11" and its lead
line; Figure 3, reference numeral --11-- is applied at the 3:00
o'clock position of the pulley 13 with the lead line ending on
the small rectangular portion of the slide 11 projecting beyond
the pulley 13 at the 3:00 o'clock position; Figure 3, read
reference numerals "40" as --41--; Figure 3, read reference
numerals "41" as --40--; Figure 3, read reference numeral "42R"
(upper) as --43R--; Figure 3, read reference numeral "42R"
(lower) as --43L--; Figure 3, read reference numeral "43" (left)
as --42L--; Figure 3, read reference numeral "43" (right) as
--42R--; Figure 3, section line 2-2 is removed and is applied as
shown below passing horizontally through the screw 42L through
the axis of spindle 14 and vertically downwardly through the
screw 43L with the section line arrowheads directed from left-
to-right,

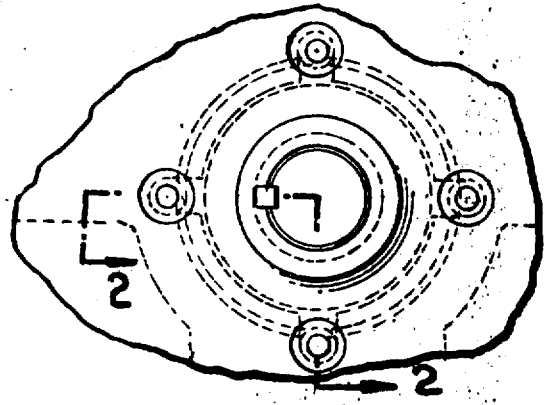

FIG. 3

Signed and sealed this 7th day of April 1970.

(SEAL)
Attest:

EDWARD M. FLETCHER, JR.                    WILLIAM E. SCHUYLER, JR.
Attesting Officer                          Commissioner of Patents